US012781923B2

(12) United States Patent

Aoun et al.

(10) Patent No.: US 12,781,923 B2

(45) Date of Patent: Nov. 3, 2026

(54) GAS SUPPLY SYSTEM FOR HIGH AND LOW PRESSURE GAS CONSUMER APPLIANCES

(71) Applicant: GAZTRANSPORT ET TECHNIGAZ, Saint Remy les Chevreuse (FR)

(72) Inventors: Bernard Aoun, Saint Remy les Chevreuse (FR); Luca Di Cairano, Saint Remy les Chevreuse (FR); Sidi Boumediene, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 20 days.

(21) Appl. No.: 19/093,451

(22) Filed: Mar. 28, 2025

(65) Prior Publication Data

US 2025/0305636 A1 Oct. 2, 2025

(30) Foreign Application Priority Data

Apr. 2, 2024 (FR) ...................................... 2403360

(51) Int. Cl.

*F17C 7/04* (2006.01)
*B67D 9/00* (2010.01)
*F17C 1/00* (2006.01)

(52) U.S. Cl.

CPC .................. *F17C 7/04* (2013.01); *B67D 9/00* (2013.01); *F17C 1/002* (2013.01); *F17C 2205/0323* (2013.01); *F17C 2205/0352* (2013.01); *F17C 2223/0153* (2013.01); *F17C 2223/033* (2013.01); *F17C 2223/035* (2013.01); *F17C 2227/0135* (2013.01); *F17C 2227/0157* (2013.01); *F17C 2227/0355* (2013.01); *F17C 2265/06* (2013.01); *F17C 2270/0118* (2013.01)

(58) Field of Classification Search

CPC ........ F17C 2223/0153; F17C 2223/033; F17C 7/04; B67D 9/00

See application file for complete search history.

(56) References Cited

U.S. PATENT DOCUMENTS

2009/0151812 A1* 6/2009 Allidieres ................. F17C 5/06 141/82
2023/0408035 A1* 12/2023 Aoun ...................... F02B 73/00

* cited by examiner

*Primary Examiner* — Jason K Niesz

(74) *Attorney, Agent, or Firm* — Oblon, McClelland, Maier & Neustadt, L.L.P.

(57) ABSTRACT

A gas supply system supplies gas to an appliance consuming high-pressure gas of a floating structure including at least one tank. The gas supply system includes at least one first supply circuit for supplying the high-pressure consumer appliance, including a first heat exchanger, a second heat exchanger, and a pump. The gas supply system also includes a pre-cooling system for pre-cooling the first heat exchanger to take gas in the liquid state from the tank. The pre-cooling system includes a pre-cooling line and a control valve for controlling the circulation of gas within the pre-cooling line.

17 Claims, 6 Drawing Sheets

GAS SUPPLY SYSTEM FOR HIGH AND LOW PRESSURE GAS CONSUMER APPLIANCES

Figure 1:
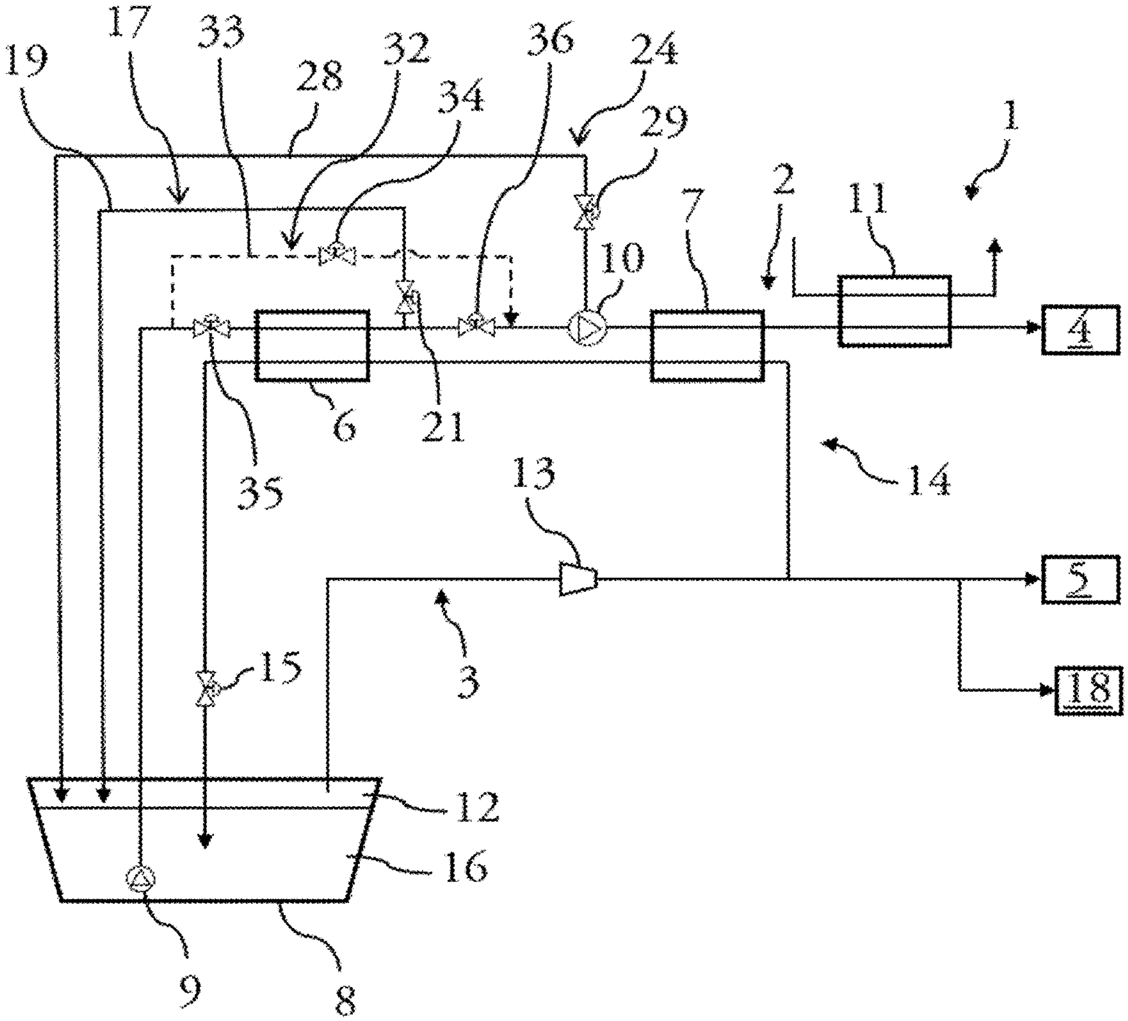

The present invention relates to the field of vessels for storing and/or transporting gas in the liquid state and more particularly concerns a gas supply system for supplying gas to consumer appliances comprised within such vessels.

During a journey performed by a vessel comprising a tank of gas in the liquid state configured to be consumed and/or to be delivered towards a destination point, said vessel may be able to use at least part of said gas in the liquid state in order to supply at least one of its engines, via a gas supply system. This is the case for vessels fitted with a ME-GI type propulsion engine. In order to supply this type of engine, the gas has to be compressed to very high pressure by special compressors capable of compressing the gas to 300 bars, but such compressors are expensive, generate high maintenance costs and induce vibrations within the vessel.

An alternative to installing these high-pressure compressors is to vaporize the gas in liquid state at 300 bar before the latter is sent to the propulsion engine. Since this solution does not eliminate the vapor gas (or BOG, which stands for "boil-off gas") that forms naturally within a tank containing at least part of the cargo, low-pressure compressors may be installed to supply an auxiliary engine capable of consuming the boil-off gas at low pressure.

However, the use of such a gas supply system requires a preparation, which corresponds to a pre-cooling, during which some of its elements are brought to a temperature below a threshold value from which the supply to the engines may begin. The size of the elements that need to be brought up to temperature is likely to vary the time required for such a pre-cooling; for example, preparing large elements will delay the start-up of the gas supply system, even if smaller elements are already at temperature.

The aim of the present invention is to overcome this disadvantage by providing a gas supply system in which the time required to bring large elements, such as a heat exchanger, up to temperature is reduced so as to speed up the time taken to get the gas supply system running.

The main object of the present invention is thus a supply system for supplying gas to at least one appliance consuming high-pressure gas and to at least one appliance consuming low-pressure gas of a floating structure comprising at least one tank configured to contain the gas, the supply system comprising: at least one first gas supply circuit for supplying gas to the appliance consuming high-pressure gas, comprising at least one first pump configured to pump the gas taken from the tank in the liquid state, at least one first heat exchanger, a second heat exchanger, a second pump arranged between the first heat exchanger and the second heat exchanger and at least one high-pressure evaporator configured to evaporate the gas circulating in the first gas supply circuit; at least one second gas supply circuit for supplying gas to the appliance consuming low-pressure gas, comprising at least one compressor configured to compress gas taken in the vapor state from the tank to an operating pressure of the appliance consuming low-pressure gas. According to the invention, the supply system comprises a pre-cooling system for pre-cooling the first heat exchanger configured to take gas in the liquid state from the tank, the pre-cooling system comprising a pre-cooling line connected to the first supply circuit between the first heat exchanger and the second pump, the pre-cooling system comprising at least one control valve for controlling the circulation of the gas within the pre-cooling line.

The supply system according to the invention is configured, for example, to equip a floating structure with a view to supplying gas to its consumer appliances. More specifically, the first gas supply circuit allows the fuel requirements of the appliance consuming high-pressure gas to be met. The latter may be the means of propulsion for the floating structure, for example an engine ME-GI. The first supply circuit extends from the tank to the appliance consuming high-pressure gas. The first pump is installed at the bottom of the tank and pumps the gas in liquid state so that it may circulate in the first supply circuit.

As the gas must be in vapor state before it may be supplied to the appliance consuming high-pressure gas, the high-pressure evaporator ensures that the gas evaporates before being supplied to the appliance consuming high-pressure gas. The high-pressure evaporator is the site of a calorie exchange between the gas in the liquid state circulating in the first supply circuit and a heat transfer fluid, for example glycol water, seawater or steam. This must be at a sufficiently high temperature to create a change of state in the gas, so that the latter passes into the vapor or supercritical state so as to supply the appliance consuming high-pressure gas.

Before the gas in the liquid state circulating in the first supply circuit is vaporized by the high-pressure evaporator, the gas in the liquid state passes through the first heat exchanger and then the second heat exchanger. To do this, the first heat exchanger and the second heat exchanger are linked to each other by a portion of the first supply circuit so that the gas in the liquid state may pass through the two heat exchangers in succession. The temperature of said gas in its liquid state thus tends to rise before it passes through the high-pressure evaporator. In this way, the gas circulating in the first supply circuit may be in a two-phase state at the outlet of the second heat exchanger.

Generally speaking, the gas contained in the tank may pass naturally, or forced by the floating structure, into the vapor state. Any gas in the tank that changes to vapor state must be evacuated so as not to create excess pressure within the tank. This function is performed by the second gas supply circuit of the appliance consuming low-pressure gas. Such a second supply circuit extends from the tank to the appliance consuming low-pressure gas. This may be an auxiliary motor such as an electric generator. The compressor on the second supply circuit is responsible for sucking up the gas from the tank head so that it may both supply the appliance consuming low-pressure gas and regulate the pressure within the tank. At the compressor outlet, the gas in vapor state may be supplied to the appliance consuming low-pressure gas.

The first heat exchanger, the second heat exchanger and the high-pressure evaporator are physically separate thermal exchangers. For example, the first heat exchanger is a re-condenser and the second heat exchanger is a pre-cooler. The second pump allows to increase the pressure of the gas in the liquid state circulating in the first supply circuit, so that the latter has a pressure compatible with the supply of the appliance consuming high-pressure gas.

The supply system comprises a system for pre-cooling the first heat exchanger, which is used to bring this first heat exchanger up to temperature during a preparation step or pre-cooling step of the floating structure. During the preparation step, the temperature of the first heat exchanger is lowered to around—140° C., for example. Such a preparation step is usually carried out when the floating structure is docked, prior to supply its consumer appliances. To this end, the supply system is configured to take gas in the liquid state from the tank, possibly by circulating it in a portion of the first supply circuit extending between the first pump and the first heat exchanger. The supply system comprises the pre-cooling line, which is connected to the first supply circuit at the outlet of the first heat exchanger and upstream of the second pump, and which is used to evacuate the gas that has passed through the first heat exchanger during pre-cooling. The passage of the gas through this pre-cooling line is governed by the presence of the pre-cooling system control valve. This control valve has an open configuration and a closed configuration, with the open configuration of the control valve allowing gas to pass into the pre-cooling line. The presence of the pre-cooling circuit means that the first heat exchanger may be pre-cooled independently of pre-cooling by the second pump.

The pre-cooling system allows the temperature of the first heat exchanger to be lowered prior to its operation within the supply system. To do this, the pre-cooling system increases the flow rate of gas through the first heat exchanger, so as to speed up the time needed to bring it up to temperature. The pre-cooling system allows, for example, to double or triple the flow rate of gas circulating within the first heat exchanger compared with a flow rate of gas normally used during operation of the first heat exchanger in order to supply the appliance consuming gas at high pressure. In this way, the time required to prepare the entire supply system is reduced, as the first heat exchanger may be brought up to temperature in a time similar to that required to bring other, smaller elements of the supply system up to temperature, such as the second pump.

According to an optional characteristic of the invention, the first supply circuit comprises a first valve disposed between the first pump and the first heat exchanger and a second valve disposed between the first heat exchanger and the second pump, the pre-cooling line being connected to the first supply circuit between the first heat exchanger and the second valve.

The first valve and the second valve form a bypass circuit for bypassing the first heat exchanger. Such a bypass circuit, associated with the pre-cooling system, allows to purge a first pass of the heat exchanger, which is located between these two valves. If the first heat exchanger is bypassed in this way, it is possible to simultaneously pre-cool the first heat exchanger and supply the second pump with gas. Using the bypass circuit also allows maintenance operations to be performed on the first heat exchanger.

According to an optional characteristic of the invention, the pre-cooling system is configured so that the pre-cooling line opens into a lower portion of the tank. According to an optional characteristic of the invention, the pre-cooling system is configured so that the pre-cooling line opens into an upper portion of the tank.

In other words, the pre-cooling line extends between the first supply circuit and the tank. The tank comprises a lower portion dedicated to the storage of gas in the liquid state and an upper portion dedicated to the storage of gas evaporated from the gas in the liquid state, the lower portion corresponding to a tank bottom and the upper portion corresponding to a tank head. Depending on the embodiments, the pre-cooling line may open either at the bottom of the tank or into the tank head. In both these cases, the pre-cooling line opens directly into the tank, i.e. it is not connected to any other duct in the supply system to open into the tank.

According to an optional characteristic of the invention, the supply system comprises a gas return line connected to the second supply circuit and configured to return the gas to the tank, the first heat exchanger and the second heat exchanger each comprising a first pass constituting the first supply circuit and a second pass constituting the return line.

In other words, the first heat exchanger and the second heat exchanger are each configured to operate a heat exchange between the gas circulating in the return line in the vapor state and the gas in the liquid state circulating in the first supply circuit. This return line is located between the compressor and the appliance consuming low-pressure gas and extends as far as the tank. At the compressor outlet, the gas in vapor state circulates through the return line if the appliance consuming low-pressure gas does not require a fuel supply. The gas in vapor state circulating in the return line first passes through the second heat exchanger, then the first heat exchanger, before returning to the tank. As a result of the exchange of calorie between the gas in the liquid state circulating in the first supply circuit and the gas in the vapor state circulating in the return line, the temperature of the gas in the vapor state decreases as it passes through the heat exchangers, until said gas condenses and returns to the liquid state substantially at the outlet of the first heat exchanger. The re-condensed gas then circulates into the tank. The first heat exchanger is configured to condense the gas circulating within the return line. The first heat exchanger is the exchanger through which the gas in the liquid state of the first supply circuit passes when said gas in the liquid state is at its lowest temperature. It is therefore the exchange of calories taking place within the first heat exchanger that will change the state of the gas circulating in the return line from vapor state to liquid state. The second heat exchanger is configured to pre-cool the gas circulating through the return line before it passes through the first heat exchanger.

According to an optional characteristic of the invention, the pre-cooling line is connected to the return line between the first heat exchanger and an outlet of the return line configured to open into the tank.

In other words, the pre-cooling line comprises a first end connected to the first supply circuit and a second end connected to the return line leaving the first heat exchanger, more precisely between the second pass of this first heat exchanger and the tank. This configuration allows to avoid the need to manufacture and install a dedicated portion of line to the tank.

According to an optional characteristic of the invention, the supply system comprises a cooling system for cooling the second pump, the cooling system comprising a cooling line connected to the first supply circuit between an inlet port of the second pump and the second heat exchanger, the cooling system comprising at least one control valve for controlling the circulation of the gas within the cooling line.

The cooling system of the second pump is the counterpart of the pre-cooling system of the first heat exchanger. The system for cooling the second pump is therefore used during the preparation step of the supply system in order to lower the temperature of the second pump prior to its operation within the supply system. To do this, the cooling system takes gas in a liquid state and increases the flow rate of this gas in a liquid state through the second pump, so that it is heated. The cooling line is either connected directly to the second pump or to the first supply circuit between this second pump and the second heat exchanger.

Depending on the case, the second pump may be cooled by means of the cooling system after the first heat exchanger has been pre-cooled by the pre-cooling system, at the same time as it is pre-cooled or even before it is pre-cooled.

According to an optional characteristic of the invention, the cooling system is configured so that the cooling line opens into the tank.

In other words, the cooling line extends between the pump and the tank. Depending on the embodiments, the cooling line may open into the bottom of the tank or into the tank head.

According to an optional characteristic of the invention, the cooling line opens into the return line between the first heat exchanger and the outlet of the return line configured to open into the tank.

The cooling line therefore extends between the inlet port of the second pump and the outlet of the second pass of the first heat exchanger. After pre-cooling the second pump, the gas in its liquid state circulates through the cooling line and then takes the return line towards the tank. This configuration allows to avoid the need to manufacture and install a dedicated portion of line towards the tank.

In the embodiments where the return line opens into the bottom of the tank, the outlet of this return line may be equipped with an ejection member such as a bubbling member. This allows to liquefy at least some of the gas in vapor state when the latter returns to the tank, also raising the temperature of the gas in liquid state in the tank.

According to an optional characteristic of the invention, the return line comprises an expansion member arranged between the first heat exchanger and an outlet of the return line configured to open into the tank.

The expansion member allows to lower the pressure of the gas circulating in the return line, once it has condensed as it passes through the first heat exchanger. Thanks to the expansion member, the gas in its liquid state is returned to the tank at a temperature close to the temperature of the liquid-vapor equilibrium of the gas. The expansion member also regulates the flow rate of gas to be condensed circulating in the return line. When one and/or other of the pre-cooling line and the cooling line open into the return line, they are connected between this expansion member and the outlet of the return line, i.e. they are connected downstream of the expansion member.

According to an optional characteristic of the invention, the supply system comprises a bypass line for bypassing the first heat exchanger, this bypass line comprising a regulating member.

This bypass line and the regulating member it carries help to form the bypass system for bypassing the first pass of the first heat exchanger.

The invention also relates to a floating structure for storing and/or transporting gas in the liquid state, comprising at least one tank configured to contain gas in the liquid state, at least one appliance consuming high-pressure gas, at least one appliance consuming low-pressure gas and at least one gas supply system for supplying gas to these consumer appliances as mentioned above.

The invention also covers a system for loading or unloading a liquid gas which combines at least one onshore and/or port installation and at least one floating structure for storing and/or transporting liquid gas as mentioned above.

The invention relates to a method for loading or unloading a liquid gas from a floating structure for storing and/or transporting gas as aforesaid, wherein pipelines for loading and/or unloading gas in the liquid state arranged on an upper deck of the floating structure may be connected, by means of suitable connectors, to a maritime or port terminal in order to transfer the gas in the liquid state from or towards the tank.

Lastly, the invention relates to a method for supplying a floating structure as mentioned above with a supply system as mentioned above, comprising at least one preliminary pre-cooling step comprising a sub-step of taking gas in the liquid state from the tank, a sub-step of cooling the first heat exchanger and a sub-step of circulating the gas within the pre-cooling line, the supply method comprising a step of supplying the appliance consuming high-pressure gas with gas in the liquid state taken from the tank.

The pre-cooling step is therefore necessary for the implementation of the supply system with a view to supplying, in particular, its appliance consuming high-pressure gas; it allows the first heat exchanger to be brought up to temperature to allow the appliance consuming high-pressure gas to be supplied in this way, and also subsequently allows the gas circulating within the return line to be condensed.

According to an optional characteristic of the invention, during the pre-cooling step the control valve of the pre-cooling system is opened.

Opening this control valve allows the gas to flow through the pre-cooling line.

According to an optional characteristic of the invention, the supply method comprises at least one cooling step prior to the supplying step, comprising a sub-step of taking gas in the liquid state from the tank, a sub-step of cooling the second pump and a sub-step of circulating the gas within the cooling line.

During this cooling step, the gas in the liquid state circulates either within the first heat exchanger, and more specifically its first pass, or within the bypass line of the bypass circuit. For example, the cooling step is carried out simultaneously with the pre-cooling step.

Figure 2:
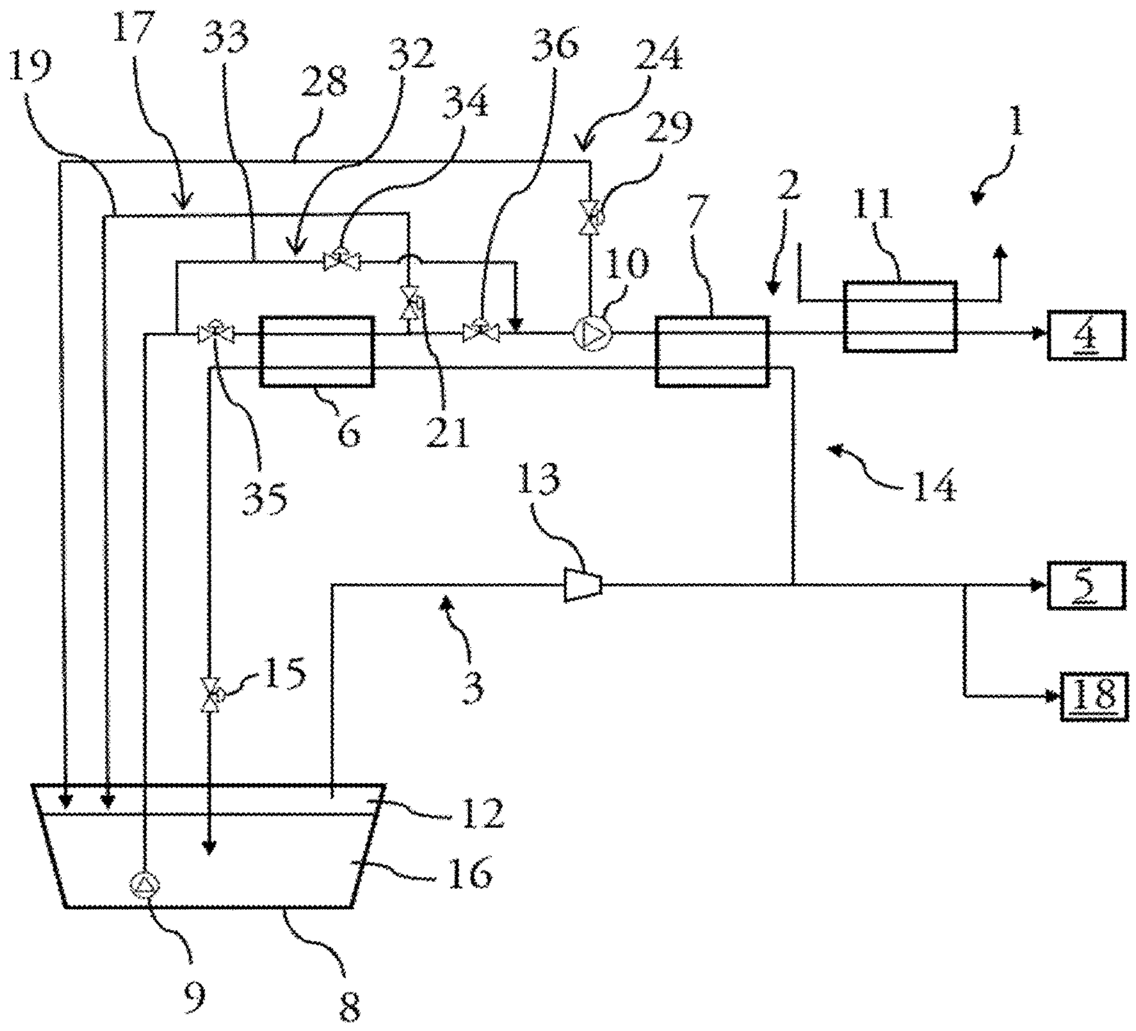
Figure 3:
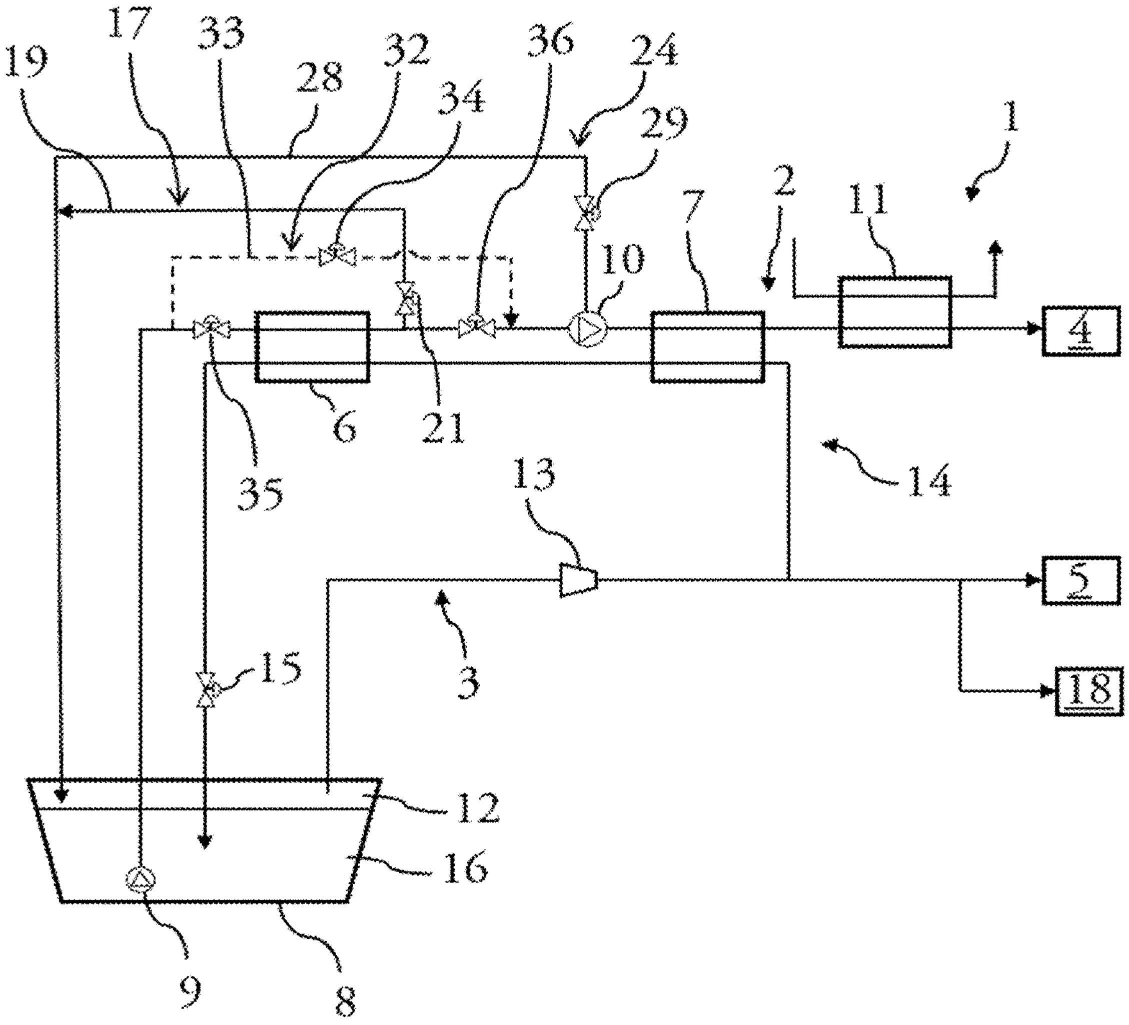
Figure 4:
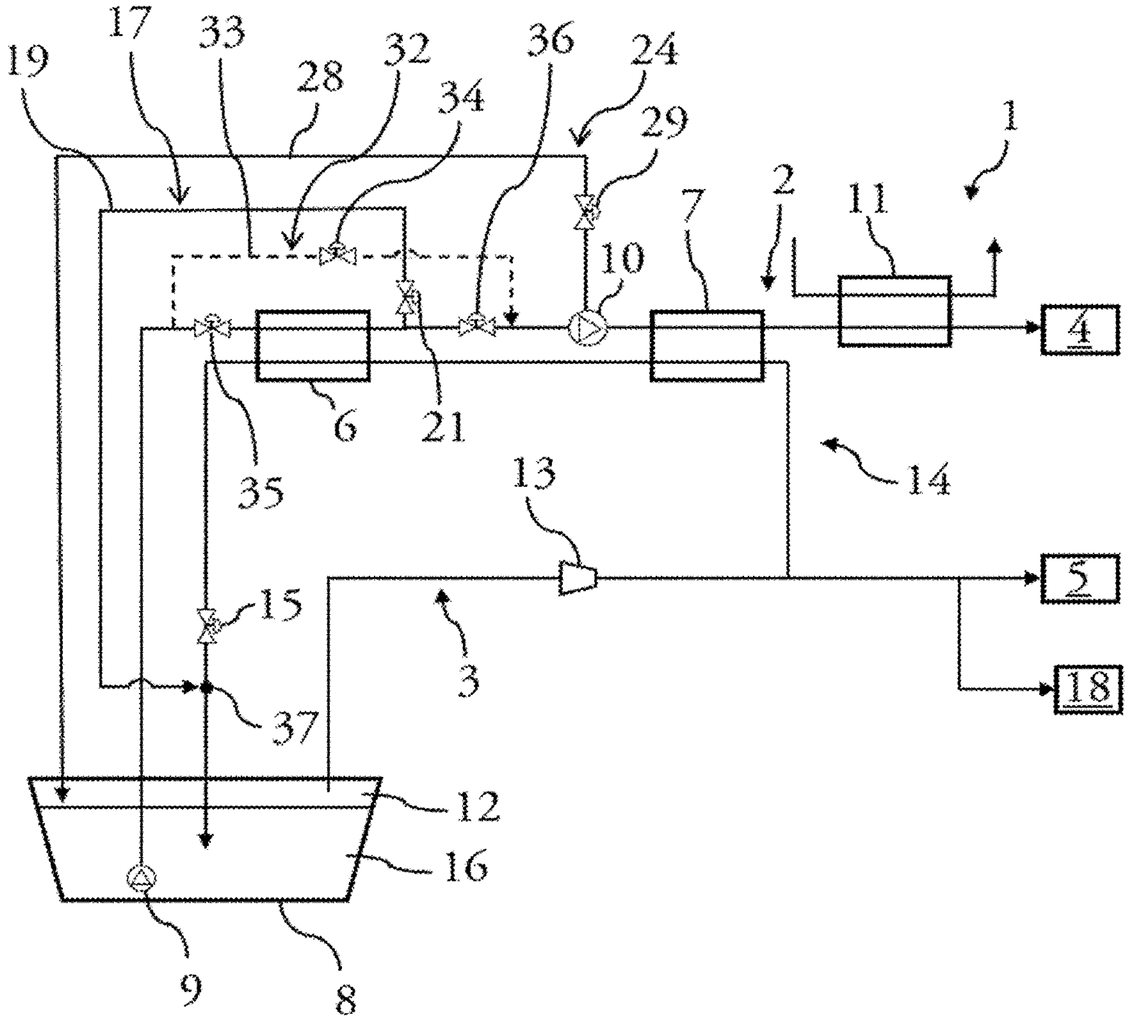
Figure 5:
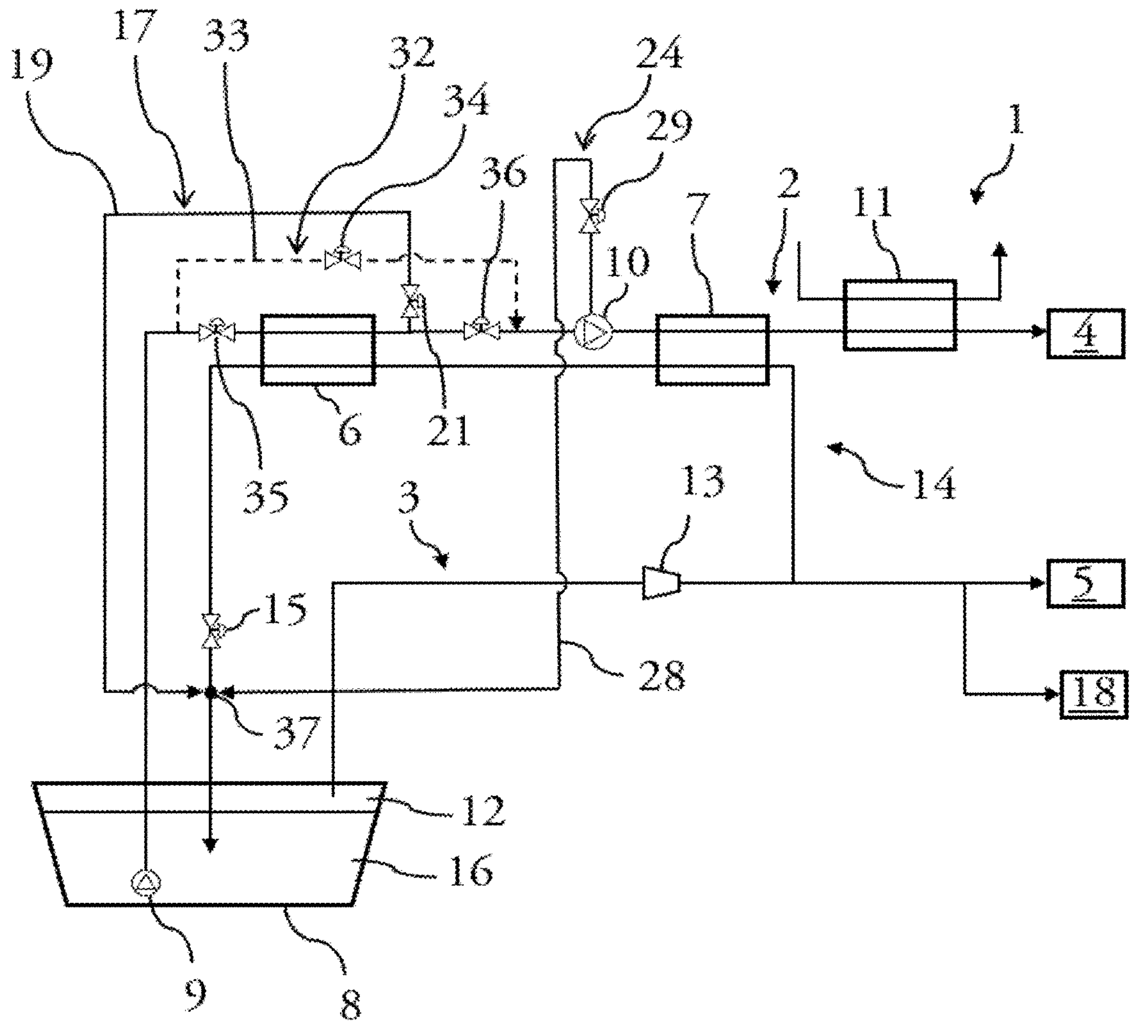
Figure 6:
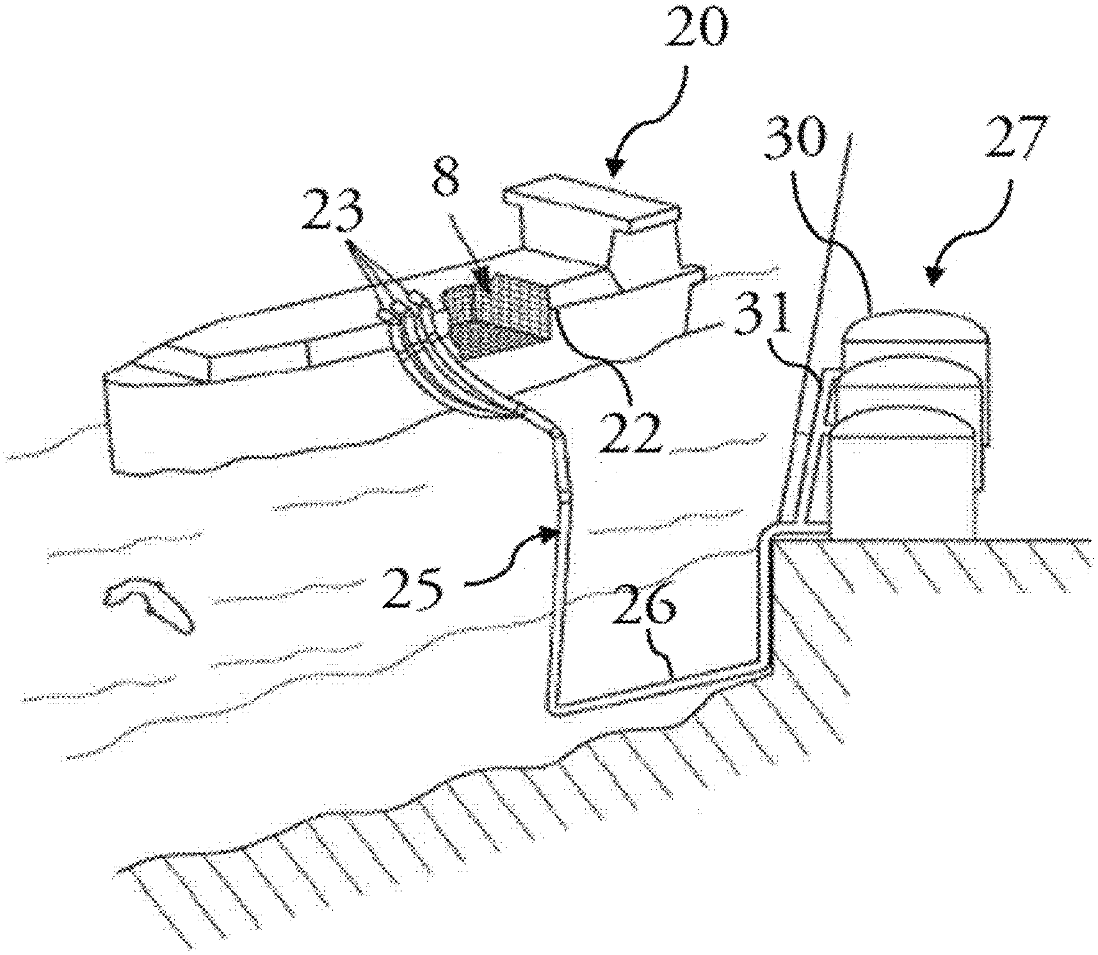

Other characteristics, details and advantages of the invention will become clearer on reading the following description, on the one hand, and examples of embodiments given by way of indication and non-limitation with reference to the annexed drawings, on the other hand, wherein:

FIG. 1 schematically illustrates a gas supply system according to the invention in a first embodiment;

FIG. 2 schematically illustrates the gas supply system shown in FIG. 1 in a second embodiment;

FIG. 3 schematically illustrates the gas supply system shown in FIG. 1 in a third embodiment;

FIG. 4 schematically illustrates the gas supply system shown in FIG. 1 in a fourth embodiment;

FIG. 5 schematically illustrates the gas supply system shown in FIG. 1 in a fifth embodiment;

FIG. 6 schematically illustrates a tank of a floating structure according to the invention and a terminal for loading and/or unloading this tank.

The characteristics, variants and different embodiments of the invention may be associated with one another in various combinations, insofar as they are not incompatible or mutually exclusive. In particular, it will be possible to imagine variants of the invention comprising only a selection of characteristics described hereinafter in isolation from the other characteristics described, if this selection of characteristics is sufficient to confer a technical advantage and/or to differentiate the invention from the prior art.

In the figures, the elements common to several figures retain the same reference. The terms “upstream” and “downstream” used in the following description are used to express positions of elements within circuits of gas in a liquid or vapor state and refer to the direction of circulation of said gas within said circuit.

FIGS. 1 to 5 schematically illustrate a gas supply system 1 according to the invention, which is integrated into a floating structure. The supply system 1 allows to circulate gas, which may be in a liquid state, a vapor state, a two-phase state or a supercritical state, from a storage and/or transport tank 8 to an appliance 4 consuming high-pressure gas and/or an appliance 5 consuming low-pressure gas in order to supply the latter with fuel.

Said floating structure may, for example, be a vessel capable of storing and/or transporting gas in a liquid state. In this case, the supply system 1 is able to use the gas in the liquid state that the floating structure stores and/or transports to supply the appliance 4 consuming high-pressure gas, which may, for example, be a propulsion engine, and the appliance 5 consuming low-pressure gas, which may, for example, be an electrical generator supplying the floating structure with electricity.

In order to ensure the circulation of the gas contained in the tank 8 to the appliance 4 consuming high-pressure gas, the supply system 1 is provided with a first gas supply circuit 2. The first supply circuit 2 comprises a first pump 9 located within the tank 8. The first pump 9 is used to pump the gas in the liquid state and circulate it in particular within the first supply circuit 2. By sucking the gas in its liquid state, the first pump 9 also raises the pressure of the gas to between 6 and 17 bar.

The gas in the liquid state, in a direction of circulation from the tank 8 towards the appliance 4 consuming high-pressure gas, passes through a first heat exchanger 6, is pumped by a second pump 10 and passes through a second heat exchanger 7. The second pump 10 allows to raise the pressure of the gas in the liquid state to a value of between 30 and 70 bar for use with liquefied petroleum gas, and preferably between 150 and 400 bar for use with ethane, ethylene or liquefied natural gas consisting mainly of methane.

After passing through the second heat exchanger 7, the gas circulates to a high-pressure evaporator 11. The high-pressure evaporator 11 is used to change the state of the gas circulating in the first supply circuit 2 to a vapor or super-critical state. Such a state allows the gas to be compatible for supplying the appliance 4 consuming high-pressure gas. The evaporation of the gas in its liquid state may take place, for example, by heat exchange with a heat transfer fluid at a sufficiently high temperature to evaporate the gas in its liquid state, in this case glycol water, seawater or steam.

Thanks to the combination of the second pump 10 and of the high-pressure evaporator 11, the gas is at a pressure and in a state compatible for supplying the high-pressure consumer appliance 4. This configuration allows to avoid the need to install high-pressure compressors on the first supply circuit 2, which are costly and generate strong vibrations.

Within the tank 8, some of the gas cargo may naturally pass into the vapor state and diffuse into a tank head 12, which corresponds to an upper part of the tank 8, as opposed to a tank bottom 16, which corresponds to a lower part of it. In order to prevent overpressure within the tank 8, the gas in the vapor state contained in the tank head 12 must be evacuated. The first supply circuit 2 is configured to use gas in the liquid state to supply the appliance 4 consuming high-pressure gas.

The supply system 1 comprises a second gas supply circuit 3, which uses gas in the vapor state to supply the appliance 5 consuming low-pressure gas. The second supply circuit 3 therefore extends between the tank head 12 and the appliance 5 consuming low-pressure gas. The second supply circuit 3 comprises a compressor 13 to suck in the vapor state gas contained in the tank head 12. In addition to sucking in the gas in vapor state, the compressor 13 also raises the pressure of the gas in vapor state circulating in the second supply circuit 3 to a pressure of between 6 and 20 bar absolute, so that the gas in vapor state is at a pressure compatible with the supply of the appliance 5 consuming low-pressure gas. The second supply circuit 3 thus allows to supply the appliance 5 consuming low-pressure gas while regulating the pressure within the tank 8 by sucking in the gas in the vapor state present in the tank head 12.

The presence of too much gas in vapor state within the tank head 12 leads to excess pressure within the tank 8. It is therefore necessary to evacuate the gas in the vapor state in order to lower the pressure within the tank 8. Excess vapor state gas may then be removed, for example, by a burner 18. However, the supply system 1 according to the invention comprises a return line 14 which extends from the second supply circuit 3 to the tank 8.

The return line 14 is connected to the second supply circuit 3 downstream of the compressor 13 with respect to a direction of circulation of the gas in the vapor state circulating in the second supply circuit 3. Depending on the direction of circulation of the gas in the vapor state circulating in the return line 14, said gas first passes through the second heat exchanger 7 and then through the first heat exchanger 6. The calorie exchange taking place within the first heat exchanger 6 and the second heat exchanger 7 is therefore between the gas in the liquid state circulating in the first supply circuit 2 and the gas in the vapor state circulating in the return line 14.

The purpose of this calorie exchange is to condense the gas in the vapor state in the return line 14, so that it changes to the liquid state and returns to the tank 8 in this state, instead of being eliminated by the burner 18. More precisely, the gas circulating in the return line 14 is in the vapor state when it enters the first heat exchanger 6 and leaves in the liquid state as a result of the calorie exchange taking place within the first heat exchanger 6. It is understood from the above that the first heat exchanger 6 and the second heat exchanger 7 each comprise a first pass constituting the first supply circuit 2 and a second pass constituting the return line 14.

In order to align the pressure of the gas circulating in the return line 14 with the pressure prevailing in the tank 8, the return line 14 may comprise an expansion member 15, arranged between the first heat exchanger 6 and an outlet of the return line 14 leading into the tank 8, which lowers the pressure of the gas to a pressure of between 1 and 3 bars absolute. Once the gas has been condensed in the first heat exchanger 6 and then expanded in the expansion member 15, it continues its journey to the outlet of the return line 14, i.e. to the tank 8. The first heat exchanger 6 therefore acts as a condenser or re-condenser.

The second heat exchanger 7 is located downstream of the first heat exchanger 6 in the direction of gas circulation in the first supply circuit 2, and upstream of the first heat exchanger 6 in the direction of gas circulation in the return line 14. The second heat exchanger 7 therefore pre-cools the gas in the vapor state circulating in the return line 14 before it is condensed within the first heat exchanger 6; in other words, the second heat exchanger 7 is a pre-cooler. In the first supply circuit 2, the gas in the liquid state at the inlet to the second heat exchanger 7 has previously passed through the first heat exchanger 6 and been pumped by the additional pump 10, thus increasing its temperature and its pressure. It is therefore possible that, as a result of the calorie exchange taking place at the level of the second heat exchanger 7, the gas circulating within the first supply circuit 2 leaves the second heat exchanger 7 in a two-phase state. The temperature of the gas circulating in the return line 14 is therefore lowered after passing through the second heat exchanger 7, implementing the pre-cooling mentioned above in relation to the second heat exchanger 7.

It should be noted that in order to be able to perform its function as a condenser for the gas circulating in the return line 14 optimally and without delay, the first heat exchanger 6 must be pre-cooled. Pre-cooling of this kind, which will be described later in relation to a method for supplying the floating structure 20, is a step prior to implementing the first heat exchanger 6 as a condenser in the return line 14.

To this end, according to the invention, the supply system 1 comprises a pre-cooling system 17 for cooling the first heat exchanger 6. The supply system 1 and its pre-cooling system 17 are shown in a first embodiment in FIG. 1, in a second embodiment in FIG. 2, in a third embodiment in FIG. 3, in a fourth embodiment in FIG. 4 and in a fifth embodiment in FIG. 5.

The pre-cooling system 17 comprises a pre-cooling line 19 which is connected differently within the supply system 1 according to the embodiments, as well as a control valve 21 for controlling the circulation of the gas within the pre-cooling line 19. This control valve 21 is carried by the pre-cooling line 19 and controls the circulation of the gas in vapor state or the gas in liquid state within it.

The pre-cooling system 17 is configured to take gas in the liquid state from the tank 8, if necessary, using the first pump 9, and to convey it to the first heat exchanger 6. The gas in the liquid state is conveyed to the first heat exchanger 6 by means of a duct in the first supply circuit 2 connecting the tank 8 to the first heat exchanger 6. This duct is therefore involved both in supplying the appliance 4 consuming high-pressure gas and in pre-cooling the first heat exchanger 6. The first heat exchanger 6 is pre-cooled when the gas in the liquid state passes through it; it is thus understood that the greater the flow rate of gas in the liquid state passing through the first heat exchanger 6, the faster the temperature of this first heat exchanger 6 will be lowered.

In addition to the pre-cooling system 17, the supply system 1 comprises a cooling system 24 for cooling the second pump 10; this cooling system 24 allows, during a step prior to supplying the appliance 4 consuming high-pressure gas, to circulate gas in the liquid state within the second pump 10 to bring it to a suitable temperature. The cooling system 24 comprises a cooling line 28 and a control valve 29 carried by the cooling line 28. It is understood that the control valve 29 controls the circulation of gas within the cooling line 28.

The cooling system 24 is configured to take gas in the liquid state from the tank 8, if necessary, using the first pump 9, and to convey it to the second pump 10. The gas in the liquid state is conveyed to the second pump 10 in particular by means of the duct of the first supply circuit 2 which connects the tank 8 to the first heat exchanger 6. This duct is therefore involved in supplying the appliance 4 consuming high-pressure gas, pre-cooling the first heat exchanger 6 and cooling the second pump 10.

The cooling line 28 is connected to the first supply circuit 2 between an inlet port of the second pump 10 and the second heat exchanger 7. Thus, either the cooling line 28 is connected to the second pump 10, as shown in the figures, or it is connected to the first supply circuit 2 between an outlet of this second pump 10 and an inlet of the second heat exchanger 7.

The control valve 29 is a proportional valve with a fully open configuration, a closed configuration and at least one intermediate configuration wherein it is partially open. When the control valve is in its closed configuration, the passage of gas in the liquid state within the cooling line 28 is prevented. Conversely, when the second pump 10 is cold, the control valve 29 is in its fully open configuration.

In the first four embodiments, the cooling line 28 extends from the first supply circuit 1 to the tank 8. In the embodiments shown in FIGS. 1 to 4, the cooling line 28 extends as far as the upper portion of the tank 8, i.e. it opens into the tank head 12. However, without departing from the scope of the invention, alternative embodiments could be envisaged wherein the cooling line 28 opens into the bottom of the tank 16. It should be noted that the control valve 29 which regulates the passage of gas through the cooling line 28 has a function of expanding the gas to the liquid state. Thus, the gas in the liquid state circulating in the cooling line 28 has a pressure of the order of 9 bar between the second pump 10 and the control valve 29, i.e. upstream of this control valve 29, and a pressure of less than 2 bar, i.e. close to that of the gas in the liquid state in the tank 8, between the control valve 29 and the tank 8, i.e. downstream of the control valve 29.

With regard to the pre-cooling system 17, in the five embodiments presented here the pre-cooling line 19 of the first heat exchanger 6 is connected to the first supply circuit 2 between this first heat exchanger 6 and the second pump 10. The control valve 21 comprises an open configuration, wherein the gas may circulate through the pre-cooling line 19, and a closed configuration, wherein such circulation is prevented. It is understood that in this open configuration, the gas is at least partially diverted towards the pre-cooling line 19, whereas in the closed configuration the gas circulates to the second pump 10. The pre-cooling circuit 17 thus allows to increase the flow rate of gas circulating within the first heat exchanger 6 without impacting the flow rate of gas sent to the second pump 10, any excess gas flow rate being diverted into the pre-cooling line 19.

In the first embodiment and in the second embodiment, shown in FIGS. 1 and 2 respectively, the pre-cooling line 19 extends between the first heat exchanger 6 and the second pump 10 on the one hand and the tank 8 on the other. In other words, the pre-cooling line 19 extends from the first supply circuit 2 to the tank 8. In FIGS. 1 and 2, the pre-cooling line 19 extends as far as the upper portion of the tank 8, i.e. it opens into the tank head 12. As already mentioned for the cooling line 28, alternative embodiments could be envisaged wherein the pre-cooling line 19 opens into the bottom of the tank 16.

It should be noted that in the second embodiment, the supply system 1 uses a bypass circuit 32 for bypassing the first heat exchanger 6. This bypass circuit 32 comprises a bypass line 33 arranged in parallel with the first pass of the first heat exchanger 6, and a regulating member 34 carried by said bypass line 33.

The bypass circuit 32 allows to prevent gas from passing through the first heat exchanger 6, in particular with a view to purging it, for example during a maintenance operation on said first heat exchanger 6. To do this, the bypass circuit 32 is used in conjunction with valves arranged on the first supply circuit 2 on either side of the first heat exchanger 6, more specifically a first valve 35 arranged upstream of the heat exchanger 6 and a second valve 36 arranged downstream of it. As shown in FIG. 2, the bypass line 33 is tapped into the first supply circuit 2 upstream of the first valve 35 and downstream of the second valve 36. In other words, the bypass line 33 runs parallel to the first supply circuit 2 between, on the one hand, a first point between the tank 8 and the first heat exchanger 6, more specifically between the tank 8 and the first valve 35, and, on the other hand, a second point between the first heat exchanger 6 and the second pump 10, more specifically between the second valve 36 and the second pump 10. It is understood that the first and second valves 35, 36 are not integrated into the bypass circuit 32 but form part of a portion of the first supply circuit 2 which the bypass circuit 32 allows to avoid.

When the regulating member 34 is open, it allows gas in the liquid state to pass through the bypass line 33. The first valve 35 allows gas in the liquid state to pass through the first pass of the first heat exchanger 6 when it is open and prevents such passage when it is closed. The second valve 35 allows gas to circulate to the second pump 10 and by extension to the appliance 4 consuming high-pressure gas when it is open, and prevents such flow when it is closed. It follows from the above that purging of the first heat exchanger 6 is implemented when the regulating member 34 is open, the first valve 35 is closed and when the pre-cooling system 17 is in operation, i.e. when the control valve 21 is in its open configuration.

It should be noted that the bypass circuit 32 may also be used when the first heat exchanger 6 has excessively high temperatures which could vaporize the gas circulating within it, which could damage the second pump 10, which would then be supplied with gas in the vapor state rather than gas in the liquid state. The bypass circuit 32 allows, in this context, to bypass the first heat exchanger 6 and thus ensure that the second pump 10 is always supplied with gas in the liquid state so that it may operate optimally.

Furthermore, thanks to the second embodiment shown in FIG. 2, it is possible to simultaneously supply the appliance 4 consuming high-pressure gas and pre-cool the first heat exchanger 6. In this case, the regulating member 34 is opened, so that gas in the liquid state may circulate through the bypass line 33 and then back through the first supply circuit 2 to the appliance 4 consuming high-pressure gas. The second valve 36 is closed to prevent the gas flowing back towards the first heat exchanger 6. At the same time, the first valve 35 is opened, so that a portion of gas in the liquid state coming from the tank 8 passes through the first heat exchanger 6 before circulating within the pre-cooling line 19. To do this, the control valve 21 of this pre-cooling line 19 is in its open configuration. Mixing between the gas that has passed through the first heat exchanger 6 and the gas that has circulated through the bypass line 33 is prevented by the second valve 36, which is closed. The second embodiment therefore allows to manage the pre-cooling of the first heat exchanger 6 while supplying the appliance 4 consuming high-pressure gas, which allows to start up the floating structure at the same time as bringing the first heat exchanger 6 up to temperature.

The third embodiment, which is illustrated in FIG. 3, differs from the first embodiment in FIG. 1 in that the pre-cooling line 19 is not connected directly to the tank 8; in other words, the pre-cooling line 19 does not open into the tank 8. Here, on the other hand, the pre-cooling line 19 is connected to the cooling line 28. More specifically, the pre-cooling line 19 is connected to the cooling line 28 downstream of the control valve 29, i.e. between this control valve 29 and the tank 8. The pre-cooling line 19 then extends from the first supply circuit 2 to the cooling line 28.

In the fourth embodiment, shown in FIG. 4, the pre-cooling line 19 does not open directly into the tank 8 either. Here, the pre-cooling line 19 is connected to the return line 14 by a convergence point 37. More specifically, the pre-cooling line 19 is connected to the return line 14 at the level of the convergence point 37 downstream of the expansion member 15, i.e. between this expansion member 15 and the outlet of the return line 14 which opens into the tank 8. If required, the outlet of the return line 14 may be equipped with an ejection member such as a bubbling member, not shown here. In this fourth embodiment, as mentioned above, the cooling line 28 opens into the tank 8.

The fifth embodiment, shown in FIG. 5, is a variant of the fourth embodiment. In this fifth embodiment, the pre-cooling line 19 is connected to the return line 14 downstream of the expansion member 15 within the convergence point 37, as is the case in the fourth embodiment. However, the fifth embodiment differs from the fourth embodiment with regard to the connection of the cooling line 28. In this case, the cooling line 28 is also connected to the return line 14 at the level of the convergence point 37. It follows from the above that the pre-cooling line 19 and the cooling line 28 are both connected to the return line 14 via the convergence point 37.

It should be noted that, insofar as they are not incompatible, the characteristics presented in relation to one of the five embodiments are, unless otherwise stated, capable of being applied, mutatis mutandis, to one or more other of these embodiments without departing from the scope of the invention.

FIG. 6 is a cutaway view of a floating structure 20 showing the tank 8 containing the gas in a liquid state and vapor state, this tank 8 being of generally prismatic shape mounted in a double hull 22 of the floating structure 20. The wall of the tank 8 comprises a primary sealing membrane configured to be in contact with the gas in the liquid state contained in the tank 8, a secondary sealing membrane arranged between the primary sealing membrane and the double hull 22 of the floating structure 20, and two thermally insulating barriers arranged respectively between the primary sealing membrane and the secondary sealing membrane and between the secondary sealing membrane and the double hull 22.

Pipelines 23 for loading and/or unloading gas in the liquid state arranged on the upper deck of the floating structure 20 may be connected, by means of suitable connectors, to a maritime or port terminal to transfer the cargo of gas in the liquid state from or towards the tank 8.

FIG. 6 also shows an example of a maritime or port terminal comprising a loading and/or unloading equipment 25, a subsea duct 26 and an onshore and/or port installation 27. The onshore and/or port installation 27 may, for example, be arranged on the quayside of a port, or in another example be arranged on a concrete gravity platform. The onshore and/or port installation 27 comprises storage tanks 30 for gas in liquid state and connecting ducts 31 connected by the subsea duct 26 to the loading and/or unloading equipment 25.

To generate the pressure required to transfer the gas to the liquid state, pumps equipped to the onshore and/or port installation 27 and/or pumps equipped to the floating structure 20 are used.

A method for supplying the floating structure 20 using the supply system 1 will now be described. Such a supply method comprises two distinct parts, namely a first part which corresponds to a preparation of the supply system 1 and a second part which is the actual supply of one and/or other of the consumer appliances 4, 5.

The supply method therefore comprises a step of pre-cooling the first heat exchanger 6 prior to a step of supplying one and/or other of the gas-consuming appliances 4, 5. The supply method also comprises a step for cooling the second pump 10, which is also prior to the step for supplying the gas-consuming appliances 4, 5.

The pre-cooling step allows to bring the first heat exchanger 6 up to temperature. This pre-cooling step begins with a sub-step for taking gas in the liquid state from the tank 8, during which gas in the liquid state is taken from the tank 8 using the first pump 9, for example, and then circulates within the first supply circuit 2 as far as the first heat exchanger 6. The pre-cooling step then comprises a sub-step for cooling the first heat exchanger 6, which corresponds to a circulation of the gas in the liquid state through the heat exchanger 6. The gas is then evacuated from the first heat exchanger 6 and circulates in the pre-cooling line 19 before being returned towards the tank 8 in a circulation sub-step. For this purpose, the control valve 21 is in its open configuration. The gas is returned towards the tank 8 either directly, as in the first and second embodiments, or by means of the cooling line 28 as described above for the third embodiment, or by means of the return line 14 in the scope of the fourth and fifth embodiments.

During the pre-cooling step according to the first, third, fourth and fifth embodiments, the bypass circuit 32 is not used, so that the regulating member 34 is closed. Conversely, the first valve 35 and the second valve 36 are both open.

The taking, pre-cooling and circulation sub-steps are implemented continuously and simultaneously until a temperature of—140° C. is reached within the first heat exchanger 6. The time required to reach this temperature is, for example, one hour, which is improved by the increased flow rate through the first heat exchanger 6 provided by the pre-cooling system 17. It should be noted that at the start of the pre-cooling step, the first heat exchanger 6 has a particularly high temperature; in fact, it vaporizes the gas in the liquid state which is delivered to it, and it is therefore gas in the vapor state which circulates within the pre-cooling line 19. Conversely, at the end of the pre-cooling step, i.e. when the first heat exchanger 6 is close to its operating temperature of—140° C., there is no vaporization within the first heat exchanger 6 and the gas circulating through the pre-cooling line 19 is therefore in the liquid state.

In parallel with the pre-cooling step, the supply method implements the cooling step, which brings the second pump 10 up to temperature. Similar to the pre-cooling step, this cooling step comprises a sub-step of taking gas in the liquid state from the tank 8, during which gas in the liquid state is taken from the tank 8 using the first pump 9, for example, and then circulates within the first supply circuit 2 as far as the second pump 10. The cooling step then comprises a sub-step for cooling the second pump 10, which corresponds to the gas in the liquid state flowing through said second pump 10. The cooling step ends with a sub-step of circulating the gas that has cooled the second pump 10 within the cooling line 28, such circulation being permitted because the control valve is in its fully open configuration.

In the same way as for the pre-cooling step, during the cooling step the taking, cooling and circulation sub-steps are implemented simultaneously and repeated until a desired temperature is reached for the second pump 10. The time required to bring the first heat exchanger 6 and the second pump 10 up to temperature in this way is, for example, one hour, such a time being improved here by the increased flow rate through the first heat exchanger 6 allowed by the pre-cooling system 17, thus equalizing the cooling times of the first heat exchanger 6 and the second pump 10.

Once the first heat exchanger 6 has been brought to its operating temperature, the pre-cooling step is completed by switching the control valve 21 from its open configuration to its closed configuration. Similarly, the step of cooling the second pump 10 is completed by the control valve 29 moving from its fully open configuration to its partially open configuration, which is compatible with a normal operating pressure of the appliance 4 consuming high-pressure gas. The supplying step of the supplying method may then be implemented. During this supplying step, gas in the liquid state is taken from the tank 8 and circulates within the first supply circuit 2 so as to pass successively through the first heat exchanger 6, the second pump 10, the second heat exchanger 7 and the high-pressure evaporator 11 in accordance with what has been described previously in order to be conveyed to the appliance 4 consuming high-pressure gas to supply it.

Notably, in the particular case of the second embodiment, the pre-cooling step and the supplying step are implemented simultaneously. During the supply method according to this second embodiment, during the taking sub-step of the pre-cooling step, at least a portion of the gas in the liquid state taken from the tank 8 is diverted from the first heat exchanger 6 by circulating via the bypass line 33 in order to be conveyed to the appliance consuming high-pressure gas. In this case, contrary to what has been described above, the regulating member 34 is open and the second valve 36 is closed.

The present invention thus proposes a gas supply system wherein the heating of a heat exchanger is carried out independently of the heating of other elements, the time required for this heating being reduced by increasing the flow rate of gas circulating within the heat exchanger.

However, the present invention is not limited to the means and configurations described and illustrated herein, and also extends to any equivalent means and configurations, as well as to any technically operative combination of such means.

The invention claimed is:

1. A supply system for supplying gas to at least one appliance consuming high-pressure gas and at least one appliance consuming low-pressure gas of a floating structure comprising at least one tank configured to contain the gas, the supply system comprising:
- at least one first gas supply circuit configured to supply gas to the appliance consuming high-pressure gas, comprising at least one first pump configured to pump the gas taken from the tank in a liquid state, at least one first heat exchanger, a second heat exchanger, a second pump arranged between the first heat exchanger and the second heat exchanger, and at least one high-pressure evaporator configured to evaporate the gas circulating in the first gas supply circuit;
- at least one second gas supply circuit configured to supply gas to the appliance consuming low-pressure gas, comprising at least one compressor configured to compress gas taken in a vapor state from the tank to an operating pressure of the appliance consuming low-pressure gas;
- a pre-cooling system configured to pre-cool the first heat exchanger configured to take gas in the liquid state from the tank, the pre-cooling system comprising a pre-cooling line connected to the first supply circuit between the first heat exchanger and the second pump, the pre-cooling system comprising at least one control valve configured to control the circulation of gas within the pre-cooling line.

2. The supply system according to claim 1, wherein the first supply circuit comprises a first valve disposed between the first pump and the first heat exchanger and a second valve disposed between the first heat exchanger and the second pump, the pre-cooling line being connected to the first supply circuit between the first heat exchanger and the second valve.

3. The supply system according to claim 1, wherein the pre-cooling system is configured so that the pre-cooling line opens into a lower portion of the tank.

4. The supply system according to claim 1, wherein the pre-cooling system is configured so that the pre-cooling line opens into an upper portion of the tank.

5. The supply system according to claim 1, further comprising a cooling system configured to cool the second pump, the cooling system comprising a cooling line connected to the first supply circuit between an inlet port of the second pump and the second heat exchanger, the cooling system comprising at least one control valve configured to control the circulation of the gas within the cooling line.

6. The supply system according to claim 5, wherein the cooling system is configured so that the cooling line opens into the tank.

7. The supply system according to claim 1, further comprising a gas return line connected to the second supply circuit and configured to return the gas to the tank, the first heat exchanger and the second heat exchanger each comprising a first pass constituting the first supply circuit and a second pass constituting the return line.

8. The supply system according to claim 7, wherein the pre-cooling line is connected to the return line between the first heat exchanger and an outlet of the return line configured to open into the tank.

9. The supply system according to claim 7, further comprising a cooling system configured to cool the second pump, the cooling system comprising a cooling line connected to the first supply circuit between an inlet port of the second pump and the second heat exchanger, the cooling system comprising at least one control valve configured to control the circulation of the gas within the cooling line, wherein the cooling line opens into the return line between the first heat exchanger and an outlet of the return line configured to open into the tank.

10. The supply system according to claim 7, wherein the return line comprises an expansion member arranged between the first heat exchanger and an outlet of the return line configured to open into the tank.

11. The supply system according to claim 7, further comprising a bypass line configured to bypass the first heat exchanger, the bypass line comprising a regulating member.

12. A floating structure for storing and/or transporting gas in the liquid state, comprising:

at least one tank configured to contain gas in the liquid state;

at least one appliance consuming high-pressure gas;

at least one appliance consuming low-pressure gas; and the supply system according to claim 1.

13. A system for loading or unloading a liquid gas, comprising:

at least one onshore and/or port installation; and the floating structure according to claim 12.

14. A method for loading or unloading a liquid gas from the floating structure according to claim 12, wherein pipelines for loading and/or unloading gas in the liquid state arranged on an upper deck of the floating structure are configured to be connected, via connectors, to a maritime or port terminal in order to transfer the gas in the liquid state from or towards the tank.

15. A method for supplying the floating structure according to claim 12 by a supply system, comprising:

at least one preliminary pre-cooling step comprising a sub-step of taking gas in the liquid state from the tank, a sub-step of cooling the first heat exchanger, and a sub-step of circulating the gas within the pre-cooling line; and a step of supplying the appliance consuming high-pressure gas with gas in the liquid state taken from the tank.

16. The supply method according to claim 15, wherein during the pre-cooling step the control valve of the pre-cooling system is opened.

17. The supply method according to claim 15, comprising at least one cooling step prior to the supplying step, comprising a sub-step of taking gas in the liquid state from the tank, a sub-step of cooling the second pump, and a sub-step of circulating the gas within the cooling line.

* * * * *